United States Patent [19]
Freund

[11] Patent Number: 5,738,008
[45] Date of Patent: Apr. 14, 1998

[54] CLAMPING APPARATUS FOR DISK-SHAPED INFORMATION MEDIUM

[75] Inventor: Michael Freund, Schorndorf, Germany

[73] Assignee: Eastman Kodak Company, Rochester, N.Y.

[21] Appl. No.: 694,367

[22] Filed: Aug. 8, 1996

[30] Foreign Application Priority Data

Aug. 31, 1995 [DE] Germany .................. 195 32 110.3

[51] Int. Cl.⁶ .................................................. B41F 17/00
[52] U.S. Cl. .................................................. 101/35; 101/407.1
[58] Field of Search ................................ 101/35, 407.1, 101/41, 42

[56] References Cited

U.S. PATENT DOCUMENTS

| | | | |
|---|---|---|---|
| 4,499,994 | 2/1985 | Rentch | 206/45.19 |
| 4,531,475 | 7/1985 | Thill | 101/35 |
| 5,320,219 | 6/1994 | Ward | 101/35 |
| 5,609,102 | 3/1997 | Bapp | 101/35 |

FOREIGN PATENT DOCUMENTS

| | | |
|---|---|---|
| 0628956 | 6/1994 | European Pat. Off. . |
| 2304723 | 8/1974 | Germany . |
| 3721651 | 12/1989 | Germany . |

*Primary Examiner*—Edgar S. Burr
*Assistant Examiner*—Leslie Grohusky
*Attorney, Agent, or Firm*—Raymond L. Owens

[57] ABSTRACT

The clamping apparatus for imprinting disk-shaped information media consists of a base plate with a central centering aid for the information medium and a cover with an annular opening. The base plate is joined pivotably to the cover by means of a hinge. A closure mechanism is provided diametrically opposite the hinge, and elastic elements, on which the information medium rests and which when the cover is closed can be compressed by the information medium, are mounted on the base plate.

9 Claims, 2 Drawing Sheets

CLAMPING APPARATUS FOR DISK-SHAPED INFORMATION MEDIUM

FIELD OF THE INVENTION

The invention relates to a clamping apparatus for imprinting disk-shaped information media.

BACKGROUND OF THE INVENTION

Label information or other decorative patterns are applied onto disk-shaped information media. The labels or patterns can involve both text and graphics. The label information provides the user with, for example, information about the content of the information medium. Optical disks, called CDs, bear the label information on one side of the information medium. The label information can be applied with conventional printing processes. Ink jet printing is a preferred printing process for disk-shaped information media, since with this the labels can be individually configured in terms of both graphics and information content.

A method for imprinting plate-shaped information media is disclosed in German Application DE-A-37 21 651. In a first embodiment, the information medium is applied on the rotation axis of a drive means, and caused to rotate. The printing head of an ink jet printer moves radially over the surface to be imprinted. In a second embodiment, the information medium is laid on two parallel transport belts which impart a linear motion to the information medium. The ink jet printing head moves perpendicular to the linear motion of the transport belts.

European Patent Application EP-A-0 628 956 discloses an optical information medium and a method for its manufacture. A protective layer covered by a hydrophilic film is provided on the disk. This film can easily be imprinted with an ink jet printer which uses water-based inks. For this purpose, the disk is laid in a rectangular holder which has an opening that is somewhat larger than the diameter of the disk. The disk itself lies on a step of the holder in such a way that the surface to be imprinted faces toward the ink jet printing head. The holder is moved by means of a transport table in the printing apparatus.

German Application DE-A-23 04 723 discloses a method and a device for producing disk-shaped information media. The printing units are arranged in planes located one above the other, and the information media are moved past the individual printing stations by means of an endless transport belt. The individual holders of the transport belt for receiving the information media are made of light ahoy, and are somewhat larger in diameter than the information media.

With the holders described above for imprinting information media it is not possible to meet the requirement that the surface of the information medium be at a constant distance from the printing head of the printing apparatus. Thickness fluctuations or warpage of the information media lead to defective or unsatisfactory printing.

SUMMARY OF THE INVENTION

It is the object of the invention to create a clamping apparatus for imprinting disk-shaped information media with which a constant distance between the surface of the information medium and the printing head can be achieved.

According to the invention, this object is attained in that a base plate with a central centering aid for the information medium is provided as well as a cover with an annular opening that is joined pivotably by means of a hinge to the base plate, that a closure mechanism is provided diametrically opposite the hinge and that elastic elements, on which the information medium rests and which when the cover is closed can be compressed by the information medium, are mounted on the base plate.

ADVANTAGES

An advantage of the apparatus according to the invention is that the surface of the information medium to be imprinted is at a constant distance from the printing head of the printing apparatus. The information medium is laid on the base plate of the clamping apparatus and aligned, by means of a slider and the centering aid provided thereon, concentrically with respect to a central countersunk recess in the base plate. The cover is pivotably joined to the base plate by means of a hinge. Provided diametrically opposite the hinge is a closure mechanism which holds the cover in the closed position. Elastic elements on which the information medium rests are applied on the base plate. When the cover is closed, the overhang of the cover and the slider overhang press the information medium against the elastic elements. This ensures that the surface of the information medium is always at the same distance from the printing head in the printing device.

DETAILED DESCRIPTION OF THE PREFERRED EMBODIMENT

The following description is limited to optical information media (CDs) which are to be imprinted on the surface which bears no information. For a person skilled in this art it is self-evident that other information media can also be imprinted with the apparatus according to the invention.

Figure 1:
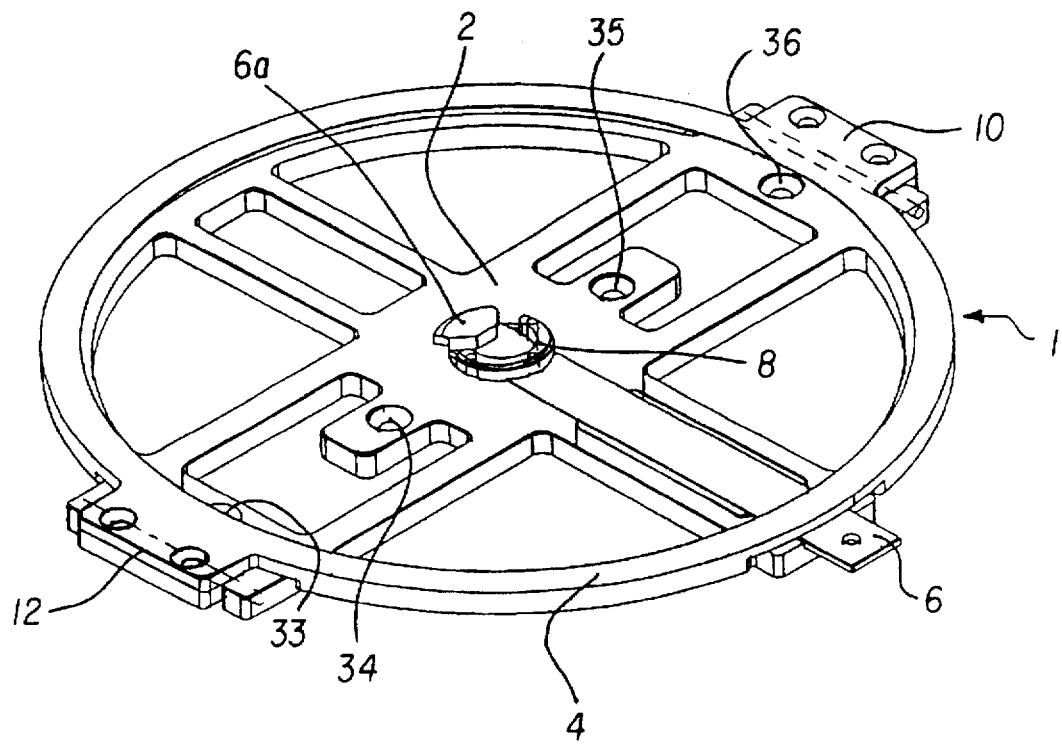
FIG. 1 shows the clamping apparatus according to the present invention in a perspective view.

A clamping apparatus 1 according to the invention is depicted in FIG. 1 in a perspective top view. For reasons of clarity, an optical information medium laid in the clamping apparatus is not shown. Clamping apparatus 1 is constructed of a base plate 2, a cover 4, and a slider 6 with centering aid 8. Base plate 2 consists substantially of a lightweight material (e.g. aluminum). The tolerance of the base plate is not critical. Cover 4, on the other hand is constructed of a low-distortion material (e.g. RYNITE steel), and has an annular opening which has a smaller diameter compared to information medium 14 to be imprinted. Centering aid 8 is used to position optical information medium 14 concentrically on the base plate with respect to a central hole 14a (see FIG. 2). Base plate 2 and cover 4 are pivotably joined together by a hinge 10. Provided diametrically opposite hinge 10 is a closure mechanism 12 which completes the clamping process after cover 4 is closed.

Figure 2:
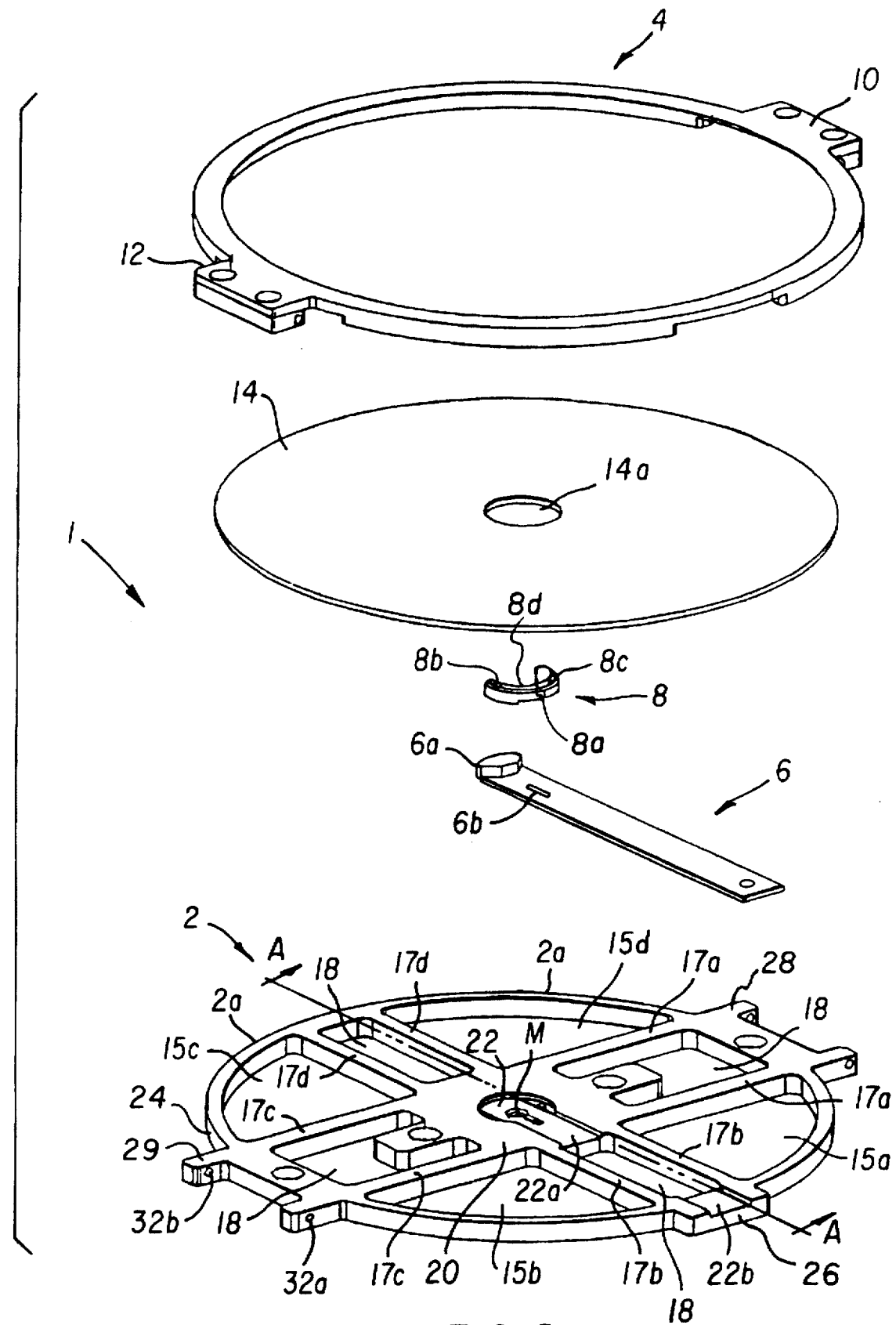
FIG. 2 shows the clamping apparatus according to the present invention in an exploded view.

The exploded view in FIG. 2 makes more clearly evident the construction and function of the clamping apparatus. Base plate 2 is substantially circular and possesses a greater diameter than the diameter of optical information medium 14. Base plate 2 can consist of a solid plate. For reasons of weight saving, however, it is recommended to provide openings in base plate 2. In the embodiment depicted in FIG. 2, four openings 15a, 15b, 15c, and 15d, which have the shape of a circle segment of approximately 90 degrees, are formed into the base plate 2. The circle segments are separated from one another by webs 17a, 17b, 17c, and 17d, the center of which has a substantially rectangular opening 18. The openings are arranged in base plate 2 so as to form a central plate 20 which is a solid, and substantially rectangular. The central portion of plate 20 possesses a circular countersunk recess 22, coaxial with center point M of base plate 2, which continues into web 17b as a countersunk recess 22a with two parallel sides. Web 17b extends out, beyond the periphery of base plate 2 delimited by a solid circular ring 24, as an extension 26. Extension 26 has a countersunk recess 22b which is aligned with respect to countersunk recess 22a and also has the same width. Shaped onto webs 17a and 17c, which run perpendicular to web 17b, are C-shaped extensions 28 and 29, the arms of which extend out beyond the periphery of base plate 2. Note that elements 15a, 15b, 15c, and 15d, 17a, 17b, 17c, and 17d, and 18 can be shaped in any way, provided they allow a rigid, flat support surface for the information medium.

Figure 3:
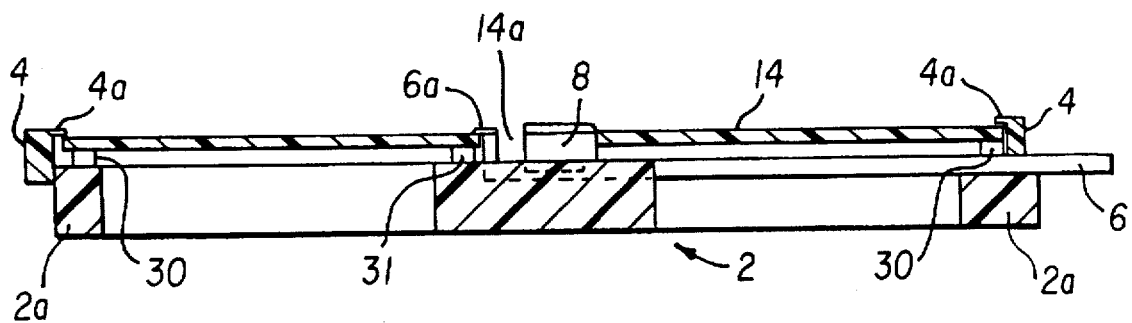
FIG. 3 shows a cross section through the clamping apparatus along line A—A of FIG. 2 with the information medium in place.

Slider 6, which has a slider overhang 6a at one end, is guided in countersunk recesses 22a and 22b. Centering aid 8 is placed on slider 6. An oblong hole 6b, which coincides with a corresponding dowel pin (not shown) in the base plate when slider 6 is inserted, is provided for this purpose in slider 6. The centering aid has a hole 8a which serves to receive a dowel pin that is guided through hole 8a of the base plate and through oblong hole 6b of slider 6. Centering aid 8 is semicircular in shape, such that the radius of centering aid 8 corresponds to the radius of central hole 14a in the optical information medium. The diameter of centering aid 8 is greater than the width of slider 6. To ensure sufficiently stable seating of centering aid 8, a countersunk recess 8d of the same width as slider 6 is shaped into the centering aid. Centering aid 8 is applied on slider 6, and two further holes 8b and 8c are provided in the centering aid in such a way that they receive, on the left and right sides of slider 6, screws (not shown) that are used to adjust the height of slider overhang 6a. A cross-section along line A—A of FIG. 2 through the clamping apparatus according to the invention, with information medium 14 in place, is show in FIG. 3. An elastic element 30 is provided on base plate 2, radially on rim 2a of base plate 2. The elastic element is applied in such a way that it is at a radial distance from center point M of base plate 2 which is less than the radius of the information medium 14 to be imprinted. A further elastic element 31 is applied around circular countersunk recess 22, although the region in which slider 6 is guided is not provided with the elastic element 31. The radial distance between elastic element 31 and center point M of base plate 2 is somewhat greater than the radius of the central hole 14a of the information medium 14. The result, as depicted for example in FIG. 3, is that information medium 14, inserted and aligned in the clamping apparatus, rests on the two elastic elements 30 and 31. As is evident from FIG. 3, cover 4 possesses a radially peripheral cover overhang 4a which, when cover 4 is closed, comes into contact with the information medium 14. Slider overhang 6a provided on slider 6 lies at the same height as cover overhang 4a. As already mentioned earlier, height adjustment is achieved by screws provided on centering aid 8. Slider 6 is held by a wire spring (not shown) in the position which immobilizes the information medium 14. It is self-evident that elastic elements 30 and 31 can be present in the form of many individual elements that are provided, in accordance with the description above, uniformly and radially on base plate 2. Elastic elements 30 are preferably distributed as small individual elements over the entire rim region of the information medium, so that when cover 4 is closed, uniform pressure on the information medium by cover overhang 4a can be achieved.

Clamping of the information medium can be achieved, for example, by the fact that after cover 4 is closed, a pin (not shown) is introduced into holes 32a and 32b of closure mechanism 12. The closure mechanism can operate according to various principles known from the prior art, for example a snap mechanism, movable mandrel or bolt, etc. Clamping and immobilization of the information medium 14 are achieved by the fact that when cover 4 is closed, the optical information medium 14 is pressed by overhang 4a of cover 4 and slider overhang 6a against elastic elements 30 and 31, respectively. The overhangs described are a maximum of 0.3 millimeters thick. As a result, distortions within information medium 14 are eliminated by pressure, and the thickness deviation is compensated for by elastic elements 30 and 31. Elastic elements 30 and 31 preferably consist of an elastic rubber coating.

The clamping apparatus according to the invention can also be applied onto a slide (not shown) which moves the clamping apparatus together with information medium 14. Holes 33, 34, 35, and 36, by means of which the entire clamping apparatus can be positively bolted onto the slide, are provided for this purpose in base plate 2.

When the clamping apparatus according to the invention is used in a printer, slider 6 must terminate flush with the outer rim of the clamping apparatus in order to allow utilization. It is also advantageous if the outer rim of the clamping apparatus is of rectangular configuration. The outside dimensions, configuration, or thickness of the information medium 14 to be clamped are implemented in accordance with requirements, so that a high level of compatibility with the various printers for information media can be achieved.

The invention has been described in detail with particular reference to certain preferred embodiments thereof, but it will be understood that variations and modifications can be effected within the spirit and scope of the invention.

Parts List 1 clamping apparatus
2 base plate
2a rim
4 cover 4a overhang
6 slider
6a slider overhang
6b oblong hole
8 centering aid
8a hole 8b hole and 8c hole
8d countersunk recess
10 hinge
12 closure mechanism
14 information media
14a central hole
15a opening
15b opening
15c opening
15d opening
17a web
17b web
17c web
17d web
18 rectangular opening
20 base plate 21 elastic element
22 countersunk recess
22a countersunk recess
22b countersunk recess
24 circular ring
26 extension
28 C-shaped extension
29 C-shaped extension
30 elastic element
31 elastic element
32a hole
32b hole
33 hole
34 hole
35 hole
36 hole
M center point

I claim:

1. Clamping apparatus for a disk-shaped information medium on which information can be printed, the medium being adapted to receive printed information and having a central hole, said clamping apparatus comprises:

(a) a base plate, said base plate having a rim and a circular countersunk recess;

(b) a central centering aid arranged so as to be received by the central hole in the information medium;

(c) a cover having a hinge and adapted to be pivotally mounted on the base plate;

(d) a closure mechanism provided diametrically opposite the hinge;

(e) at least one elastic element mounted radially on said rim and around said circular countersunk recess of the base plate and arranged to receive the information medium and being adapted to be compressed when the cover is closed; and (f) an annular opening provided in said cover such that said information is printable through said annular opening whilst the cover is closed.

2. Clamping apparatus according to claim 1, characterized in that the diameter of the cover annular opening is smaller than the diameter of the information medium, and the diameter of the annular opening is defined by an annular overhang of the cover such that the annular overhang contacts the information medium when the cover is closed.

3. Clamping apparatus according to claim 2, further including a slider; the base plate being formed with a rectangular countersunk recess which is adapted to receive the centering aid and slider; the slider having an overhang which is substantially the same height as the annular overhang of the cover and the overhang of said slider and the annular overhang of the cover contact the information medium when the cover is closed.

4. Clamping apparatus according to claim 3, wherein the centering aid is disposed on the slider.

5. Clamping apparatus according to claim 4, characterized in that the base plate is made of aluminum.

6. Clamping apparatus according to claim 1, characterized that the cover is made of steel.

7. Clamping apparatus according to claim 1, characterized in that the elastic element is made of an elastic rubber coating; the diameter of the rim being less than the diameter of the information medium; the base plate includes a rectangular countersunk recess, the base plate terminates in a central circular portion; and that the elastic element being applied radially around the central circular portion of the countersunk recess in the base plate, the diameter of the radially applied element being greater than the diameter of the central hole of the information medium.

8. Clamping apparatus according to claim 6, characterized in that the elastic element is provided as a plurality of individual elements on the base plate, the individual elements are distributed uniformly with respect to the circular countersunk recess and the diameter of the information medium.

9. Clamping apparatus according to claim 2, characterized in that the annular overhang of the cover and the overhang of the slider have a maximum thickness of 0.3 millimeters.

* * * * *